(12) United States Patent
Yoshioka et al.

(10) Patent No.: US 9,437,857 B2
(45) Date of Patent: Sep. 6, 2016

(54) BATTERY ASSEMBLY

(75) Inventors: Toshiki Yoshioka, Ritto (JP); Yoshihiro Masuda, Ritto (JP); Yukiko Yoshioka, legal representative, Kyoto (JP); Noritaka Yoshioka, legal representative, Kyoto (JP); Miki Yoshioka, legal representative, Kyoto (JP)

(73) Assignee: GS YUASA INTERNATIONAL LTD., Kyoto-shi, Kyoto (JP)

( * ) Notice: Subject to any disclaimer, the term of this patent is extended or adjusted under 35 U.S.C. 154(b) by 83 days.

(21) Appl. No.: 14/126,821

(22) PCT Filed: Jun. 18, 2012

(86) PCT No.: PCT/JP2012/065490
§ 371 (c)(1),
(2), (4) Date: Dec. 16, 2013

(87) PCT Pub. No.: WO2012/173269
PCT Pub. Date: Dec. 20, 2012

(65) Prior Publication Data
US 2014/0120400 A1 May 1, 2014

(30) Foreign Application Priority Data

Jun. 17, 2011 (JP) .................................. 2011-135424

(51) Int. Cl.
*H01M 2/18* (2006.01)
*H01M 2/10* (2006.01)
(Continued)

(52) U.S. Cl.
CPC ............. *H01M 2/18* (2013.01); *H01M 2/1077* (2013.01); *H01M 10/613* (2015.04); *H01M 10/647* (2015.04); *H01M 10/6557* (2015.04); *H01M 10/6566* (2015.04); *H01M 10/60* (2015.04)

(58) Field of Classification Search
CPC . H01M 10/613; H01M 10/60; H01M 2/1077
See application file for complete search history.

(56) References Cited

U.S. PATENT DOCUMENTS 8,293,397 B2 10/2012 Uchida et al.
2001/0007728 A1* 7/2001 Ogata et al. .................. 429/120
(Continued)

FOREIGN PATENT DOCUMENTS

JP 2004-031364 A 1/2004
JP 2004-047426 A 2/2004
(Continued)

OTHER PUBLICATIONS

International Search Report (ISR) (PCT Form PCT/ISA/210), in PCT/JP2012/065490, dated Sep. 18, 2012.

*Primary Examiner* — Jeremiah Smith
(74) *Attorney, Agent, or Firm* — McGinn IP Law Group, PLLC

(57) ABSTRACT

A spacer disposed between first and second unit cells has a corrugated portion. The corrugated portion includes first and second protrusions alternating continuously and repeatedly in a vertical direction. The first protrusions protrude from a center in the thickness direction toward the first unit cell to form clearances that function as cooling passages between the first protrusion and the second unit cell. The second protrusions protrude from the center in the thickness direction toward the second unit cell to form clearances that function as cooling passages between the second protrusions and the first unit cell. The spacer includes a straight portion extending in a direction crossing the cooling passages so as to prevent elongation of the corrugated portion in a direction perpendicular to the cooling passages.

19 Claims, 9 Drawing Sheets

(51) Int. Cl.
*H01M 10/647* (2014.01)
*H01M 10/6557* (2014.01)
*H01M 10/6566* (2014.01)
*H01M 10/613* (2014.01)
*H01M 10/60* (2014.01)

(56) References Cited

U.S. PATENT DOCUMENTS

2006/0049799 A1  3/2006  Hamada et al.
2006/0240318 A1  10/2006  Kim et al.
2009/0061299 A1* 3/2009  Uchida et al. ............ 429/156
2011/0052960 A1* 3/2011  Kwon et al. .............. 429/120

FOREIGN PATENT DOCUMENTS

| JP | 2006-073461 A | 3/2006 |
| JP | 2009-54403 A | 3/2009 |
| JP | 2009-134937 A | 6/2009 |
| JP | 2010-015949 A | 1/2010 |
| JP | 2010-186681 A | 8/2010 |
| JP | 2011-076779 A | 4/2011 |

* cited by examiner

BATTERY ASSEMBLY

This is a national phase application in the United States of International Patent Application No. PCT/JP2012/065490 with an international filing date of Jun. 18, 2012, which claims priority of Japanese Patent Application No.: 2011-135424 filed on Jun. 17, 2011, the contents thereof being incorporated herein by reference.

TECHNICAL FIELD

The present invention relates to a battery assembly having a plurality of unit cells combined with each other and, more particularly, to the structure of a spacer held between unit cells.

BACKGROUND ART

There has been conventionally known a structure in which a spacer is held between unit cells in a battery assembly so as to form a cooling passage, through which a cooling medium passes, so that the cooling medium passing the cooling passage cools the unit cells that generate heat by repeated electric charging/discharging.

JP 2006-073461 A (paragraphs 0025 to 0027 and FIG. 2) discloses a spacer held between battery modules. In the spacer, first abutting portions that abut against a first battery module out of two adjacent battery modules and second abutting portions that abut against a second battery module are alternately disposed, and thus, cooling passages in which the first battery module is brought into contact with a cooling medium and other cooling passages in which the second battery module is brought into contact with the cooling medium are alternately formed. Moreover, the spacer is provided with walls for preventing the cooling passages from being narrowed when the battery modules expand between the first abutting portion and the second abutting portion.

JP 2004-031364 A (paragraph 0056 and FIG. 5) discloses a corrugated spacer held between battery modules, wherein cooling passages are defined by clearances between the spacer and the battery modules.

JP 2004-047426 A (paragraphs 0035 to 0041 and FIG. 7) discloses disposing a spacer having cooling passages formed threat between secondary batteries and interposing a corrugated plate between the secondary batteries. In particular, JP 2004-047426 A discloses a spacer in which structures, each having a lateral bar and a vertical wall combined with each other, define two kinds of cooling passages alternately arranged.

JP 2010-140802 A (paragraphs 0028 and 0029 and FIG. 2) discloses a cell holder (i.e., a spacer) in which recesses and projections linearly extending at a surface opposite to a storage cell are alternately arranged, wherein a cooling passage is defined in a clearance defined between the recess and the storage cell.

JP 2010-186681 A (paragraphs 0017 and 0018 and FIG. 2) discloses a battery holder (i.e., a spacer) in which grooves are formed at both surfaces of a base wall, and then, a cooling passage is formed from a slit at a support frame at one end of the base wall to a slit at a support frame at the other end through the grooves.

JP 2010-015949 A (paragraph 0022) discloses an uneven spacer having projections and grooves alternately arranged, wherein a cooling medium is allowed to pass through the grooves.

These spacers described in the prior art documents are all prone to elongate in a direction perpendicular to the cooling passages because of their corrugated shapes, because of which, when the adjacent unit cells expand, the distance between the adjacent unit cells is reduced. Such reduction in the distance between adjacent unit cells reduces the flow path cross-sectional area of the cooling passages, whereby the cooling efficiency is decreased.

SUMMARY OF INVENTION

Technical Problem

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide a battery assembly having spacers that can prevent elongation in a direction perpendicular to cooling passages.

Solution to Problem

The present invention provides a battery assembly comprising, a first unit cell and a second unit cell arranged adjacent to each other; and a spacer arranged between the first and second unit cells for providing a cooling passage for a cooling medium to flow through, wherein the spacer comprises, a corrugated portion formed with first protrusions protruding from a center in a thickness direction of the spacer toward the first unit cell to form clearances that function as the cooling passages between first protrusions and the second unit cell, and second protrusions protruding from the center in the thickness direction toward the second unit cell to form clearances that function as the cooling passages between the second protrusions and the first unit cell, the first and second protrusions continuously and repeatedly alternating in a direction perpendicular to the cooling passages, and a straight portion extending in a direction crossing the cooling passages.

A cooling medium flows through the clearances between the first protrusions of the corrugated portion and the second unit cell and the clearances between the second protrusions and the first unit cell, so that these clearances function as cooling passages. In this way, the spacer can be made thinner, while clearances are formed with a cross-sectional area necessary for them to function as cooling passages between the first and second unit cells.

With the straight portion, the rigidity of the corrugated portion in the direction perpendicular to that of the cooling passages can be reinforced. Even though the spacer is compressed by the first and second unit cells due to expansion of the unit cells, the spacer can prevent elongation in the direction perpendicular to that of the cooling passages of the corrugated portion, and can thereby prevent the interval between the first and second unit cells from being reduced. As the interval between the first and second unit cells is maintained, the flow path cross-sectional area of the cooling passages is secured, so that the cooling efficiency can be maintained.

More specifically, the first protrusions abut against the first unit cell, and the second protrusions abut against the second unit cell.

Preferably, the corrugated portion is formed with a slit extending in a direction crossing the cooling passages, and the straight portion connects one edge and the other edge of the slit.

The cooling medium that has passed through the clearances between the first protrusions of the corrugated portion and the second unit cell (cooling medium that has contacted with the second unit cell) flows into the slit. The cooling medium that has passed through the clearances between the second protrusions of the corrugated portion and the first unit cell (cooling medium that has contacted with the first unit cell) also flows into the slit. As the cooling medium flows through the slit, it contacts with both of the first and second unit cells, so that the cooling efficiency is increased.

The spacer may further include a first bar and a second bar at one end and the other end in a direction perpendicular to the cooling passages of the corrugated portion, with the straight portion connecting these first bar and second bar.

The spacer can have even higher rigidity with this configuration.

The straight portion may be located offset from the center in the thickness direction of the spacer to one side or the other in the thickness direction.

The straight portion may be located at a midpoint of a dimension of the clearances in the thickness direction of the spacer.

The flow of the cooling medium that has flowed into the slit is split by the straight portion into a flow toward the first unit cell and a flow toward the second unit cell, and the flows merge after they have passed through the straight portion. This causes the flow of cooling medium on the side of the first unit cell and the flow of cooling medium on the side of the first unit cell to change their positions, whereby the cooling efficiency is increased.

The straight portion should preferably have a smaller thickness than the dimension of the clearances in the thickness direction of the spacer, as the flow of the cooling medium will then not be impeded by the straight portion.

At least one end of the straight portion either on an upstream side or a downstream side of the cooling passages should preferably be provided with a chamfer at a corner portion. With this configuration, the cooling medium can be smoothly passed through the straight portion without pressure drop.

The straight portion may be made of metal. A straight portion made of metal can have higher strength itself than a straight portion made of resin so that it can increase the rigidity of the corrugated portion in the direction perpendicular to that of the cooling passages more effectively. A metallic straight portion can also reliably prevent a decrease in strength caused by the heat generated by the unit cells.

Advantageous Effects of Invention

The spacer in the battery assembly of the present invention has a corrugated portion with first and second protrusions alternating continuously and repeatedly in a direction perpendicular to that of cooling passages, wherein clearances that function as the cooling passages are formed between the first and second protrusions and the unit cells. In this configuration, the spacer can be made thinner, while clearances are formed with a cross-sectional area necessary for them to function as cooling passages between the unit cells. As the spacer is provided with a straight portion, the rigidity of the corrugated portion is increased in the direction perpendicular to that of the cooling passages, and as the interval between the unit cells is maintained in the event of unit cell expansion, the cooling efficiency is maintained.

BRIEF DESCRIPTION OF THE DRAWINGS

The foregoing and the other features of the present invention will become apparent from the following description and drawings of an illustrative embodiment of the invention in which:

FIG. 6($b$) is a cross-sectional view along the line VIb-VIb;

DESCRIPTION OF EMBODIMENTS

Figure 1:
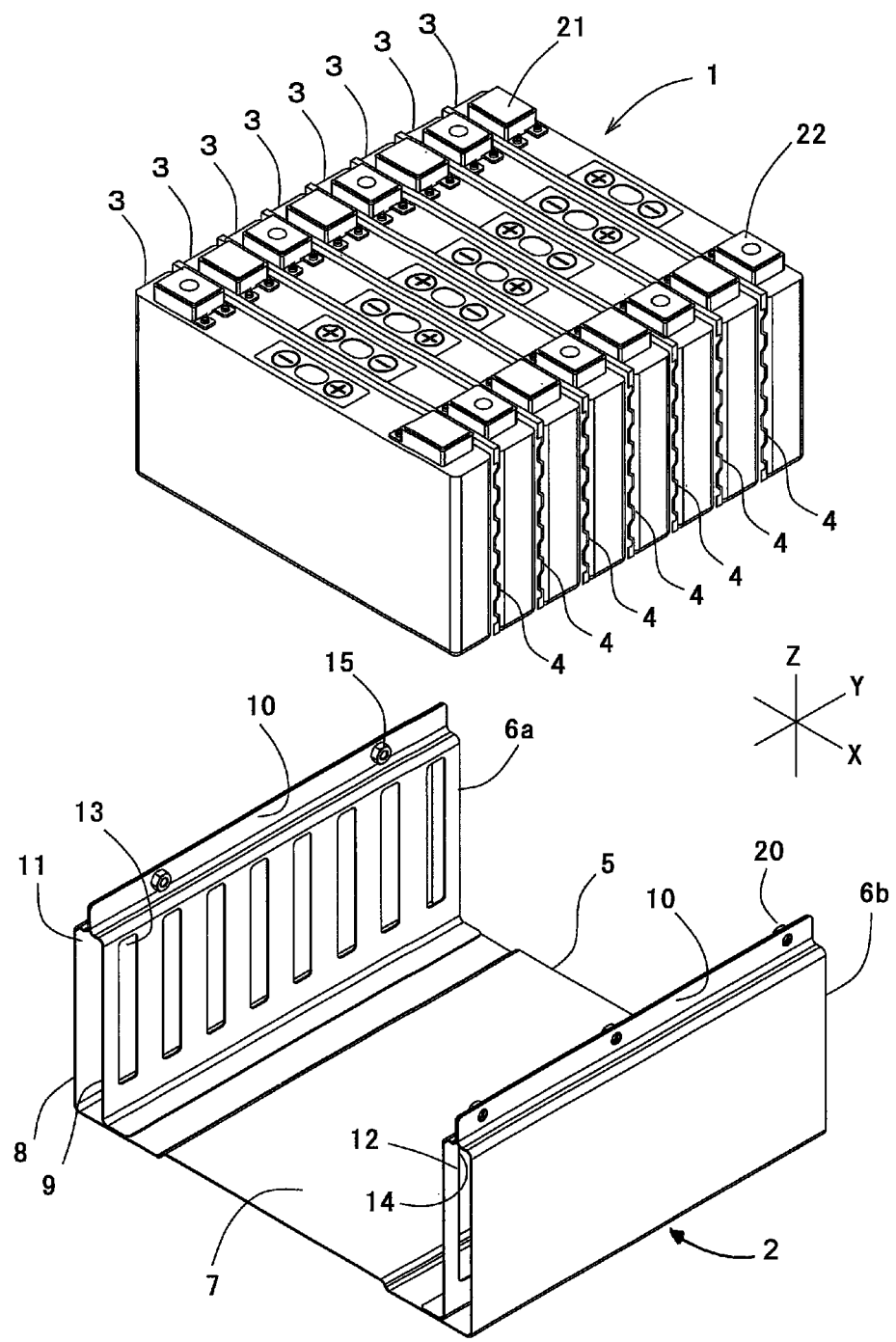
FIG. 1 is a perspective view of a battery assembly according to the present invention.
Figure 2:
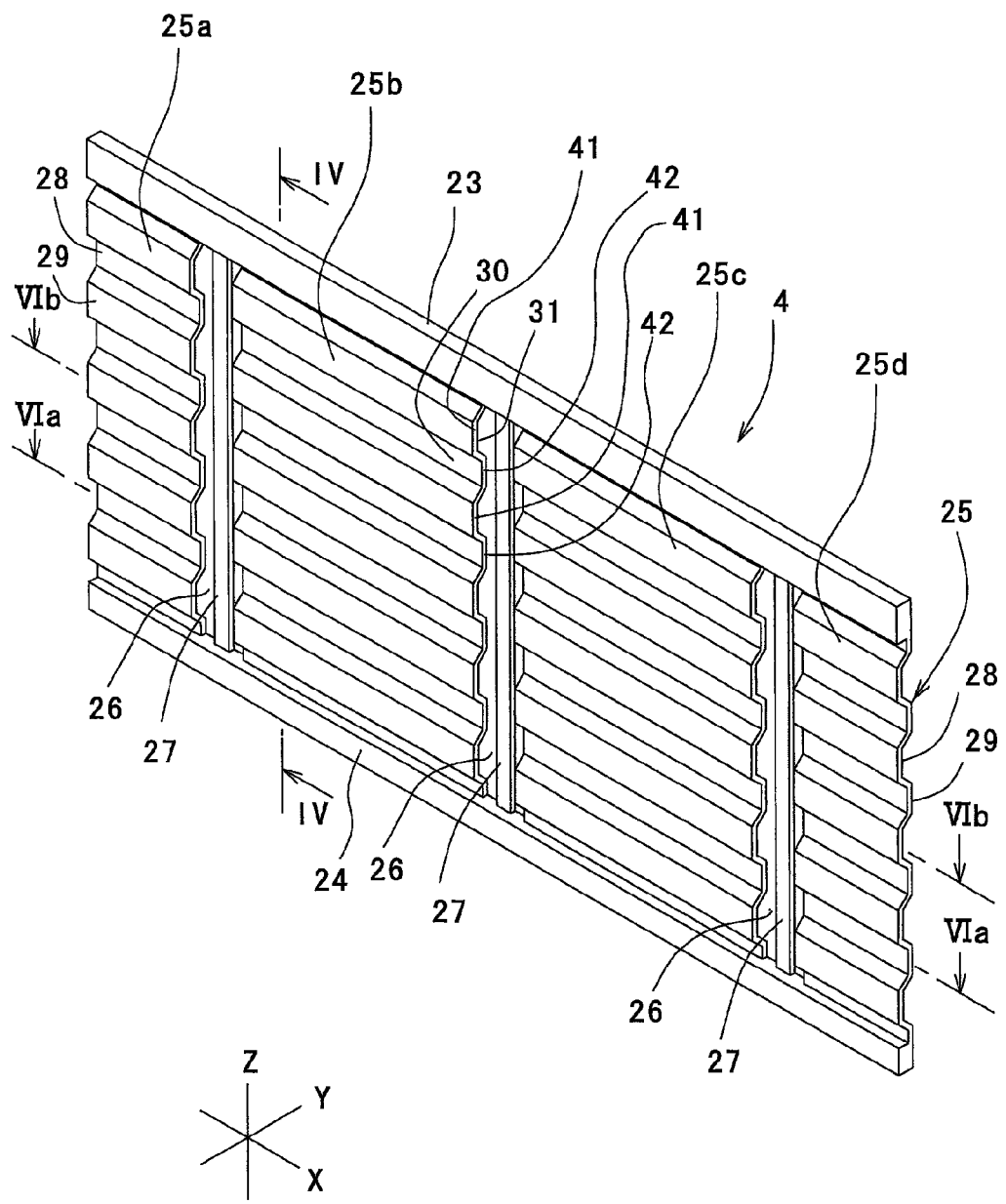
FIG. 2 is a perspective view of a spacer in the battery assembly of FIG. 1.

Preferred embodiments according to the present invention will be described with reference to the attached drawings. In the present specification, an X-axis and a Y-axis are set perpendicularly to each other on a horizontal plane whereas a Z-axis is set on a vertical plane perpendicular to the X- and Y-axes for the sake of explanation, as shown in FIG. 1. Directions parallel to the X-, Y-, and Z-axes are referred to as an X-direction, a Y-direction, and a Z-direction, respectively.

FIG. 1 shows a battery assembly 1 according to a preferred embodiment of the present invention. In the battery assembly 1, a plurality of unit cells 3 are juxtaposed in a stack case 2, and further, spacers 4 are held between the unit cells 3.

The stack case 2 is made of a steel plate. The stack case 2 includes a rectangular bottom plate 5 extending in the X- and Y-directions and a left wall 6$a$ and a right wall 6$b$ erected in the Z-direction at both ends in the X-direction of the bottom plate 5. The stack case 2 is opened at both ends in the Y-direction and at an upper end in the Z-direction.

The bottom plate 5 includes a battery mount 7 that is slightly higher at the center thereof than at both ends in the X-direction.

Each of the left wall 6$a$ and the right wall 6$b$ is formed of an outer wall 8 and an inner wall 9. The lower end of the outer wall 8 is formed integrally with the bottom plate 5 in such a manner as to be continuous to the end of the bottom plate 5 in the X-direction. The lower end of the inner wall 9 is joined to the bottom plate 5. Respective upper ends 10 of the outer wall 8 and the inner wall 9 are bent in an L shape toward each other, followed by joining to each other.

A space defined between the outer wall 8 and the inner wall 9 on the left wall 6a forms a first refrigerant passage 11. In the same manner, a space defined between the outer wall 8 and the inner wall 9 on the right wall 6b forms a second refrigerant passage 12.

A plurality of first openings 13 communicating with the first refrigerant passage 11 are formed on the inner wall 9 on the left wall 6a at the same predetermined intervals in the Y-direction as the arrangement intervals of the spacers 4. A plurality of second openings 14 similar to the first openings 13 formed on the left wall 6a are formed also on the inner wall 9 on the right wall 6b.

To the upper ends 10 and 10 of the walls 6a and 6b are securely fixed nuts 15 for fixing a cover, not shown.

The unit cell 3 is a non-aqueous secondary battery such as a lithium-ion battery. The unit cell 3 has a width in the X-direction, a depth in the Y-direction, and a height in the Z-direction such that it can be held between the left wall 6a and the right wall 6b of the stack case 2. The unit cell 3 has a positive electrode 21 and a negative electrode 22 at the upper surface thereof. The positive electrodes 21 and the negative electrodes 22 in the unit cells 3 adjacent to each other in the Y-direction are connected to each other via bus bars, not shown. The unit cell 3 may be constituted of a literally single cell or may be constituted of a unit consisting of a plurality of small cells arranged in the X-direction.

The spacer 4 is made of a synthetic resin. The spacer 4 includes an upper bar 23 and a lower bar 24 extending in the X direction, and a corrugated portion 25 formed between these upper bar 23 and lower bar 24. Slits 26 are formed to extend in the Z direction from the upper bar 23 to the lower bar 24 at three locations in the X direction, in the center and at both ends of the corrugated portion 25. Inside each slit 26 is a straight portion (connecting portion) 27 extending straight in the Z direction and connecting the upper and lower edges of the slit 26, i.e., the upper and lower bars 23 and 24. The direction in which the slits 26 and the straight portions 27 extend need not necessarily be the Z direction as long as they extend in a direction crossing the cooling passages 30 and 31 to be described later.

As for the size of the spacer 4, a width in the X-direction is determined as being the same as or smaller than that of the unit cell 3, and further, a height in the Z-direction is determined as being the same as or greater or smaller than that of the unit cell 3. The dimension in the Y-direction, that is, the thickness of the spacer 4 determines the interval between the adjacent unit cells 3 in the Y-direction. The dimension in the Z-direction, that is, the height of each of the upper bar 23 and the lower bar 24 of the spacer 4 should be preferably as small as possible in order to widen the corrugated portion 25 as possible so as to secure the cooling passages 30 and 31, described later.

Figure 6:
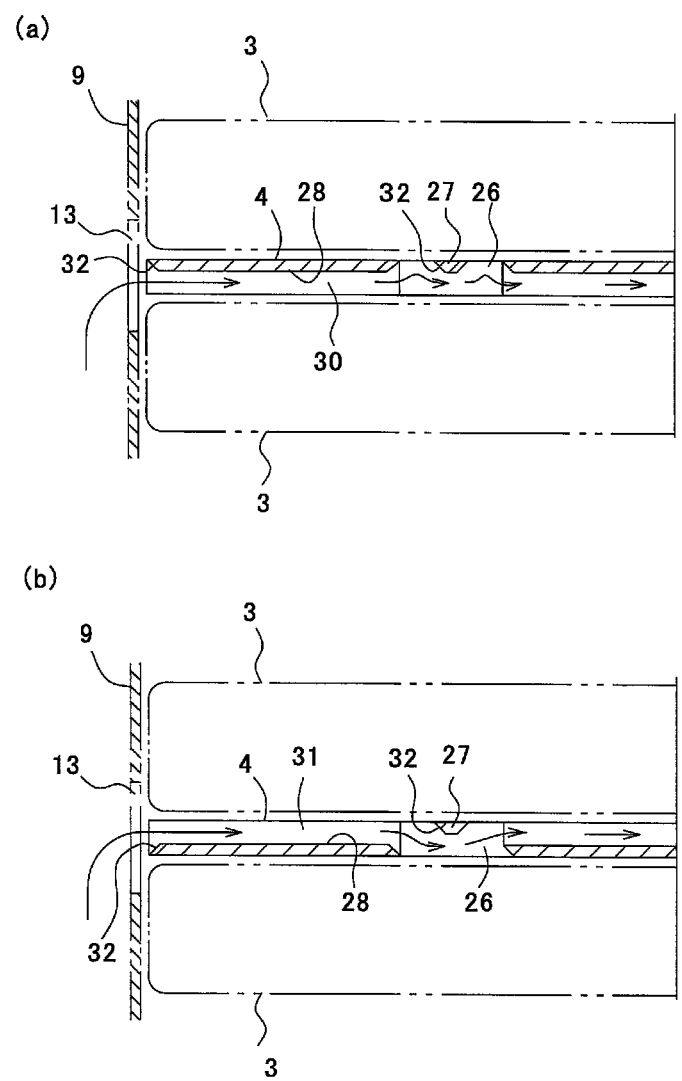
FIG. 6($a$) is a cross-sectional view of the spacer of FIG. 2 along the line VIa-VIa.

The corrugated portion 25 in the spacer 4 includes first protrusions 41 and second protrusions 42 continuously and repeatedly alternating in the Z direction (direction perpendicular to the cooling passages 30 and 31 to be described later). The first protrusions 41 protrude toward the unit cell 3 on the left side in the X direction from the center C (see FIG. 4) in the thickness direction of the spacer 4. The clearances between the first protrusions 41 and the unit cell 3 on the right side in the X direction function as cooling passages 31. The second protrusions 42 protrude toward the unit cell 3 on the right side in the X direction from the center C in the thickness direction of the spacer 4. The clearances between the second protrusions 42 and the unit cell 3 on the left side in the X direction function as cooling passages 30. As is most clearly shown in FIG. 4, when viewed from the X direction, the corrugated portion 25 appears to have a zigzag or meander shape, as the first and second protrusions 41 and 42 continuously and repeatedly alternate. Although FIG. 4 shows clearances between the unit cells 3 and the spacer 4 for convenience of illustration, in actuality, the first protrusions 41 are in contact with the unit cell 3 on the left side, and the second protrusions 42 are in contact with the unit cell 3 on the right side (and the same applies to FIG. 6 to FIG. 8 to be referred to later).

The corrugated portion 25 having the continuously and alternately formed first and second protrusions 41 and 42 has the following shape when viewed from one side.

Figure 4:
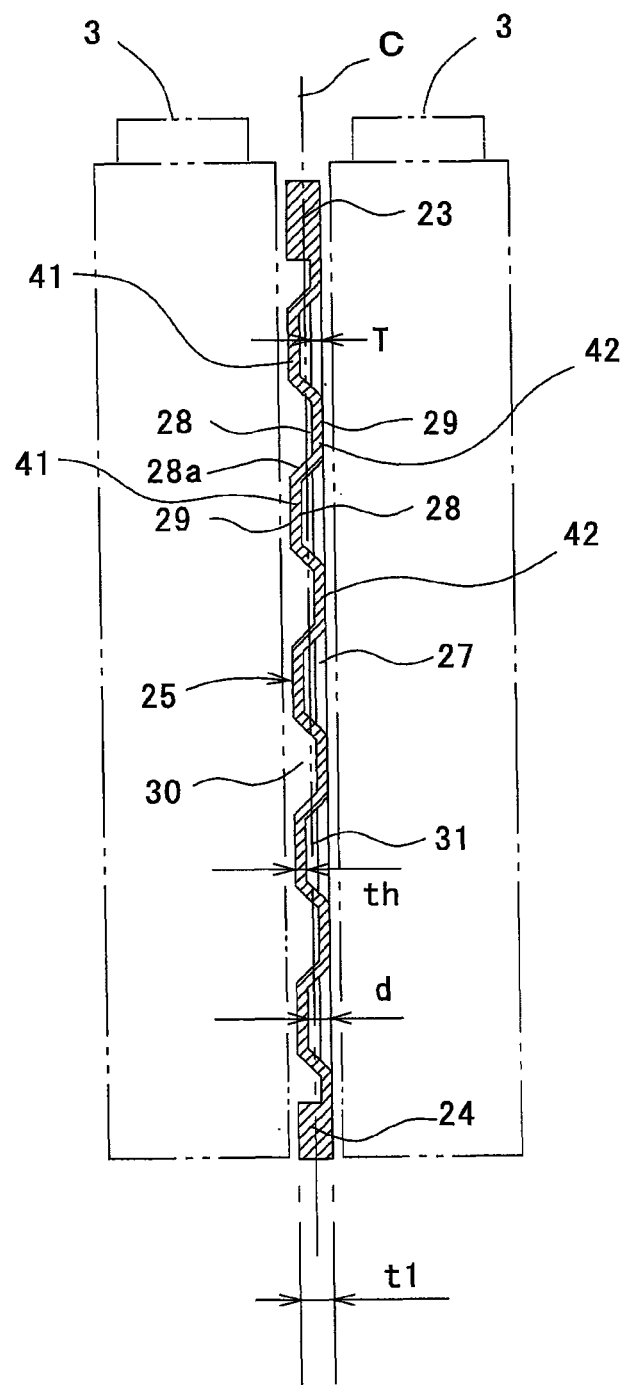
FIG. 4 is a cross-sectional view of the spacer of FIG. 2 along the line IV-IV.

The corrugated portion 25 has recesses 28 and projections 29 extending in the X direction and alternating in the Z direction on a first surface viewed from the Y direction (left side in FIG. 4). Likewise, the recesses 28 and projections 29 extend in the X direction and alternate in the Z direction on a second surface that is the back side of the first surface (right side in FIG. 4). While the corrugated portion 25 in this embodiment has flat recesses 28 and projections 29 continuously formed via slopes 28a, it may be shaped otherwise, such as flat recesses and projections continuously formed via horizontal portions, or recesses and projections continuously formed in a wavy manner.

A bevel chamfer 32 is provided at a corner portion to the edge of the corrugated portion 25 on at least one of an upstream side and a downstream side of the cooling passages 30 and 31. The chamfer may be a round chamfer. This will reduce the pressure drop in the flow of the cooling medium, so that the cooling medium flows smoothly through the cooling passages 30 and 31.

The recesses 28 on the first surface and the projections 29 on the second surface have shapes complementing each other, i.e., the recesses 28 on the first surface form the projections 29 on the second surface. Similarly, the projections 29 on the first surface and the recesses 28 on the second surface have shapes complementing each other, i.e., the projections 29 on the first surface form the recesses 28 on the second surface. The recesses 28 on the first surface form the cooling passages 30 for the unit cell 3 that faces the first surface, while the projections 29 on the first surface are in contact with the unit cell 3 that faces the second surface. Similarly, the recesses 28 on the second surface form the cooling passages 31 for the unit cell 3 that faces the second surface, while the projections 29 on the second surface are in contact with the unit cell 3 that faces the first surface.

The corrugated portion 25 of the spacer 4 is divided by the slits 26 into four portions in the X direction, first to fourth corrugated portions 25a, 25b, 25c, and 25d. The recesses 28 and the projections 29 of the first to fourth corrugated portions 25a, 25b, 25c, and 25d are in the same phase positions, so that the recesses 28 of the respective corrugated portions 25a, 25b, 25c, and 25d are on the same lines in the X direction, and likewise the projections 29 are on the same lines in the X direction.

Figure 3:
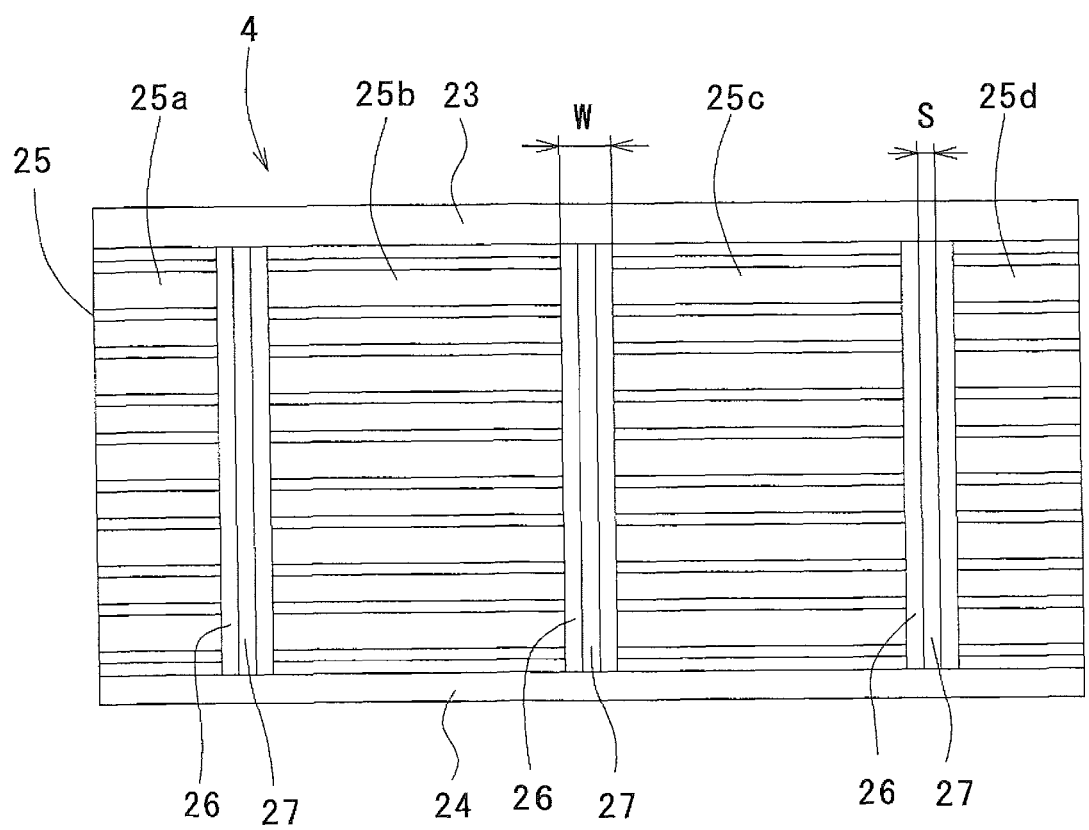
FIG. 3 is a front view of the spacer in the battery assembly of FIG. 1.

The slits 26 in the spacer 4 should have a smallest possible width W in the X direction as shown in FIG. 3 to keep the rigidity of the spacer 4. The number of the slits 26 is preferably three as in the example, but there may be more slits, or one slit may be provided in the center, or two slits may be provided at both ends.

The straight portions (connecting portions) 27 of the spacer 4 have a rectangular cross section in this example, but they may have a circular or oval cross section. The straight portions 27 are offset from the center of the thickness of the spacer 4 to one side or the other in the thickness direction.

While the straight portions 27 in this example are offset toward the second surface, they may be offset toward the first surface.

The straight portions 27 of the spacer 4 may have any width S in the X direction (see FIG. 3) as long as it is smaller than the width W of the slits 26. It may be determined in consideration of the tensile strength of the spacer in the Z direction and the overall rigidity. The thickness T in the Y direction of the straight portions 27 should preferably be smaller than the depth of the recesses 28, and more preferably, substantially the same as or thinner than the thickness in the Y direction of the corrugated portion 25 as shown in FIG. 4, so as to reduce the flow path resistance in the cooling passages 30 and 31.

A bevel chamfer 32 is provided at a corner portion to the edge of the straight portion 27 on at least one of an upstream side and a downstream side of the cooling passages 30 and 31. The chamfer may be a round chamfer. This will reduce the pressure drop in the flow of the cooling medium, so that the cooling medium flows smoothly through the cooling passages 30 and 31.

The number of the straight portions 27 is preferably three as in the example, but there may be more, or one straight portion may be provided in the center, or two straight portions may be provided at both ends. If there is only one straight portion 27, the ends of the corrugated portion 25 on both sides of that straight portion 27 will be more prone to elongate, allowing the unit cells 3 to bulge by expansion thereof. For preventing such bulging of the unit cells 3 by their expansion, the straight portions 27 should preferably be provided in plurality.

Referring to FIG. 4, the thickness t1 of the spacer 4 corresponds to the sum of the depth d of the cooling passages 30 and 31 and the material thickness th of the spacer 4. Namely, with the use of the corrugated portion 25 formed with the first and second protrusions 41 and 42 alternating continuously and repeatedly in a direction perpendicular to the cooling passages 30 and 31, the spacer 4 can be made thinner, while clearances are formed with a cross-sectional area necessary for them to function as cooling passages 30 and 31 between the unit cells 3.

Next, the effects of the battery assembly 1, in particular the spacer 4, configured as described above will be described.

Figure 5:
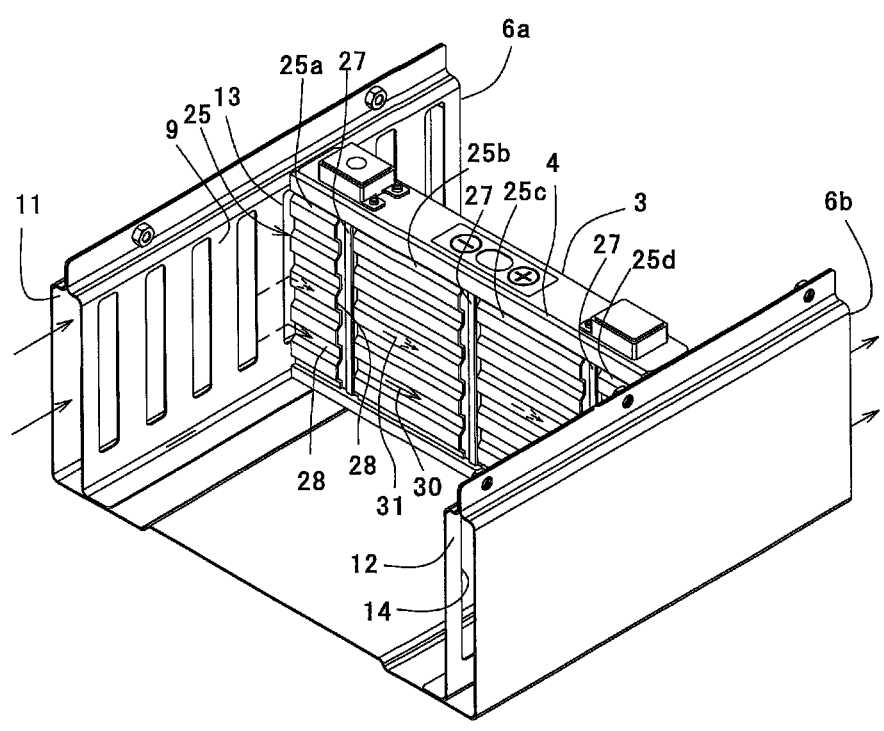
FIG. 5 is a perspective view showing the flows of a cooling medium in the battery assembly of FIG. 1.
Figure 5:
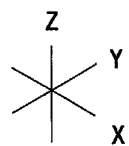

As shown in FIG. 5, the refrigerant introduced into the first refrigerant passage 11 in the left side wall 6a of the stack case 2 flows through the first openings 13 in the inner wall 9 into the recesses 28 on the first surface (clearances between the second protrusions 42 and the unit cell 3 on the left side) and the recesses 28 on the second surface (clearances between the first protrusions 41 and the unit cell 3 on the right side) of the spacer 4. The refrigerant that has flowed from the first openings 13 into the recesses 28 on the first surface of the spacer 4 flows in the X direction through the cooling passages 30 formed by the recesses 28 and cools the unit cell 3 that faces the first surface. Similarly, the refrigerant that has flowed from the first openings 13 into the recesses 28 on the second surface of the spacer 4 flows in the X direction through the cooling passages 31 formed by the recesses 28 and cools the unit cell 3 that faces the second surface. The refrigerant that has passed through the cooling passages 30 and 31 of the first to fourth corrugated portions 25a to 25d of the spacer 4 flows out from the recesses 28 through the second openings 14 in the right side wall 6b of the stack case 2 into the second refrigerant passage 12.

The straight portions 27 increase the rigidity of the corrugated portion 25 in the Z direction. As the unit cells 3 expand due to repeated charging and discharging, adjacent unit cells 3, 3 press the spacer 4. The corrugated portion 25 of the spacer 4 tries to extend in the Z direction as it is compressed, but the straight portions 27 support the corrugated portion 25 to prevent the elongation. As the corrugated portion 25 of the spacer 4 is prevented from elongation, the interval between adjacent unit cells 3 is kept constant and prevented from reducing, so that clearances with a cross-sectional area necessary for them to function as cooling passages are secured and the cooling efficiency is maintained.

As shown in FIG. 6(a), when the cooling medium flows through the cooling passages 30 formed by the recesses 28 on the first surface of the spacer 4 (clearances between the second protrusions 42 and the unit cell 3 on the left side) and passes through the slit 26, the flow is disturbed as the medium flows in between the slit 26 and the straight portion 27, and cools the unit cell 3 that faces the second surface, too, so that the cooling efficiency is increased.

As shown in FIG. 6(b), when the cooling medium flows through the cooling passages 31 formed by the recesses 28 on the second surface of the spacer 4 (clearances between the first protrusions 41 and the unit cell 3 on the right side) and passes through the slit 26, the flow is disturbed by collision against the straight portion 27 and bending toward the first surface, and cools the unit cell 3 that faces the first surface, too, so that the cooling efficiency is increased.

The embodiment described above may be changed in various ways.

Figure 7:
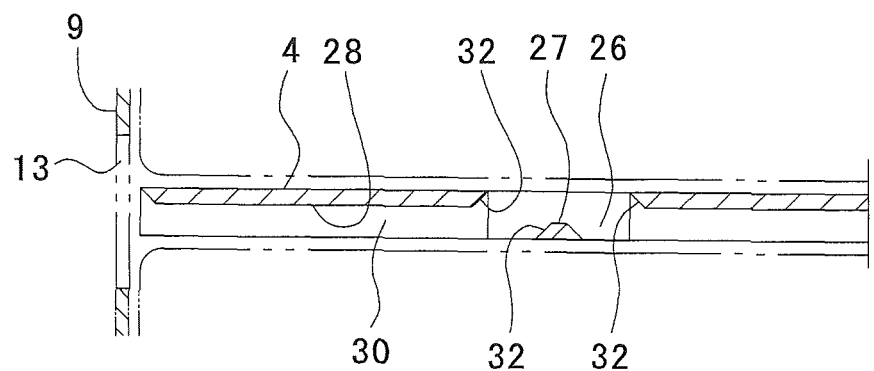
FIG. 7 is a cross-sectional view of a variation example of the spacer of FIG. 2.

For example, while the straight portions 27 of the spacer 4 are located on the opening side of the recesses 28 on the second surface in the Y direction of the spacer 4 in this embodiment, the straight portions may be located on the opening side of the recesses 28 on the first surface, as shown in FIG. 7. In FIG. 7, bevel chamfers 32 are provided to the ends of the straight portions 27 and the recesses 28 on the upstream and downstream sides of the cooling passages 30.

Figure 8:
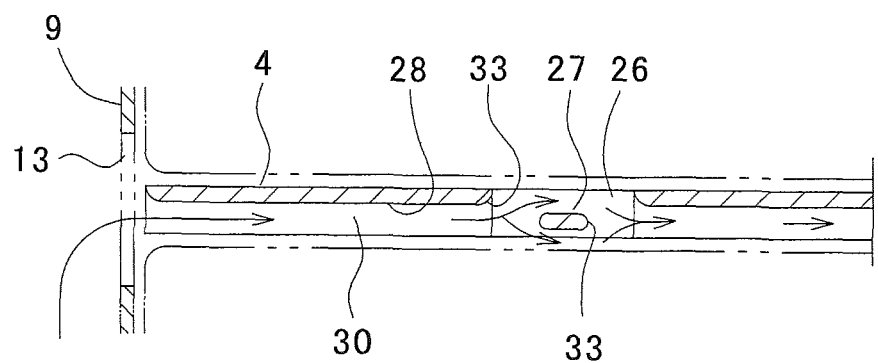
FIG. 8 is a cross-sectional view of another variation example of the spacer of FIG. 2.

The straight portions 27 may also be located in the midpoint of the depth of the recesses 28, as shown in FIG. 8. In this case, the refrigerant that flows out from the recesses 28 is split into a flow toward one side and a flow toward the other side of the adjoining unit cells 3 as it flows toward the straight portion 27, and the split flows merge as they flow past the straight portion 27. This causes the flow of refrigerant on the bottom side of the recesses 28 and the flow of refrigerant on the opening side of the recesses 28 in close proximity to the unit cells 3 to change their positions, whereby the cooling efficiency is increased. In FIG. 8, round chamfers 33 are provided to the ends of the straight portions 27 and the recesses 28 on the upstream and downstream sides of the cooling passages 30.

Figure 9:
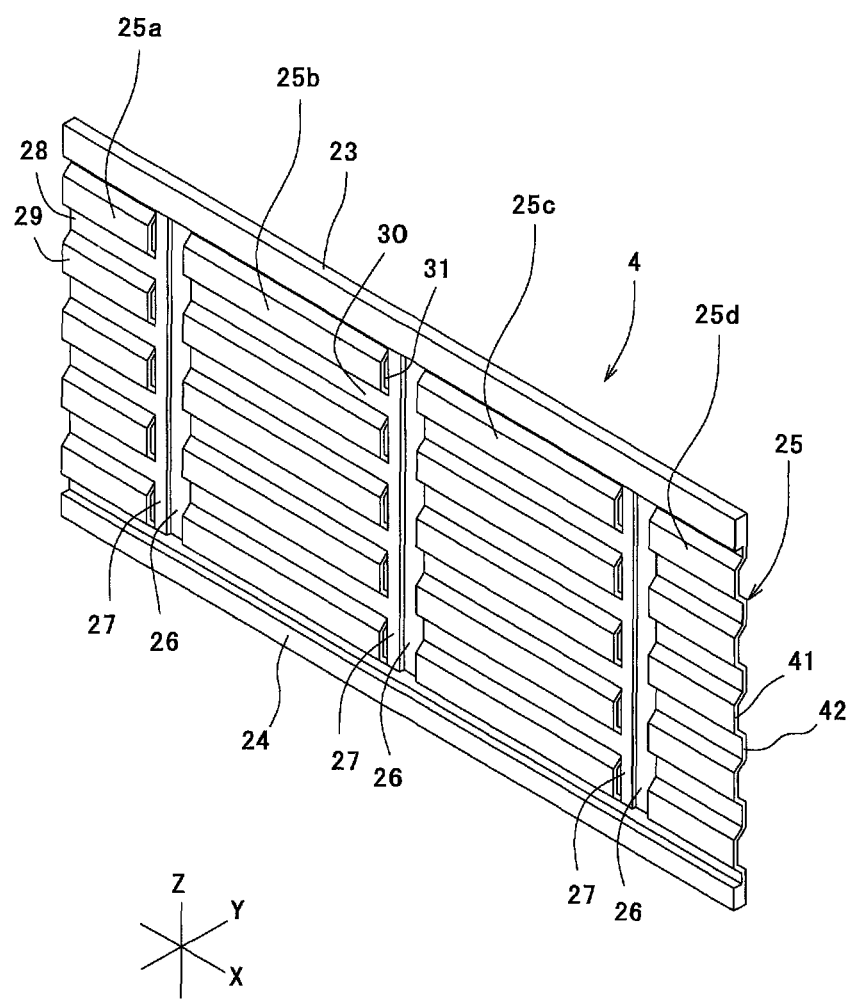
FIG. 9 is a perspective view of yet another variation example of the spacer of FIG. 2.

As shown in FIG. 9, at least portion of the straight portions 27 in the X direction may be joined to the edges of the slits 26, i.e., the ends of the recesses 28 or projections 29.

Figure 10:
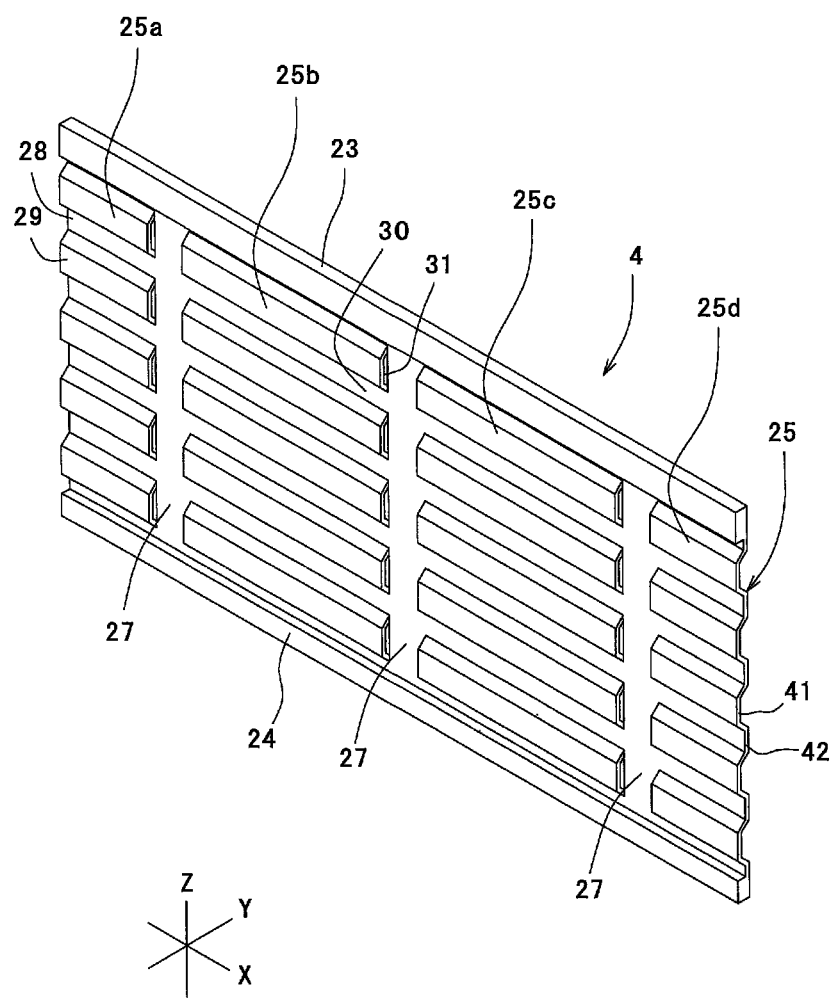
FIG. 10 is a perspective view showing another embodiment of the spacer.

Alternatively, the straight portions 27 may be formed without the slits 26 as in the embodiment described above. Namely, as shown in FIG. 10, straight portions 27 may be provided to be coplanar with two corrugated portions 25 adjacent to each other in the direction of the cooling passages 30 and 31 on the first surface, for example, the recesses 28 of the second corrugated portion 25b and the third corrugated portion 25c (in other words, the projections 29 of the second corrugated portion 25b and the third corrugated portion 25c on the second surface). The spacer 4 can then have higher rigidity as there are no slits, and the flow resistance of the refrigerant flowing through the cooling passages 30 and 31 will be reduced.

The upper bar 23 and the lower bar 24 may be omitted, but the spacer 4 can have higher rigidity with these bars.

The straight portions 27 may be made of metal. Straight portions 27 made of metal can have higher strength themselves than straight portions made of resin so that they can increase the rigidity of the corrugated portion 25 in the Z direction more effectively. Metallic straight portions 27 can also reliably prevent a decrease in strength caused by the heat generated by the unit cells. While the straight portions 27 in this embodiment are substantially straight rod-like members having a rectangular cross section, they may be curved to some extent, or may be partially protruded or recessed. The straight portions 27 should preferably be substantially straight as in this embodiment to achieve the effect of increasing the rigidity of the corrugated portion 25 in the Z direction.

In this embodiment, the protrusions 41 and 42 of the corrugated portion 25 of the spacer 4 are each directly abutting or contacting with the unit cells 3. There may be interposed an inclusion between the spacer 4 and the unit cells 3 arranged on both sides thereof such that the inclusion will be positioned between the protrusions 41 and 42 and the unit cells 3. That is, the protrusions 41 and 42 may indirectly abut or contact with the unit cells via an inclusion. Such an inclusion may for example be, but not limited to, a sheet that has insulating properties.

Various modifications and alterations of the disclosure will become apparent to those skilled in the art without departing from the spirit and scope of the disclosure, which is defined by the accompanying claims.

The invention claimed is:

1. A battery assembly comprising:
a first unit cell and a second unit cell arranged adjacent to each other; and
a spacer arranged between the first and second unit cells for providing a plurality of cooling passages for a cooling medium to flow through, wherein the spacer comprises:
a corrugated portion comprising:
first protrusions protruding from a center in a thickness direction of the spacer toward the first unit cell to form clearances of the plurality of cooling passages between the first protrusions and the second unit cell; and
second protrusions protruding from the center in the thickness direction toward the second unit cell to form clearances of the plurality of cooling passages between the second protrusions and the first unit cell, the first and second protrusions continuously and repeatedly alternating in a direction perpendicular to the cooling passages; and
a straight portion extending in a direction crossing the plurality of cooling passages,
wherein the corrugated portion comprises a slit and the straight portion is formed in the slit.

2. The battery assembly according to claim 1, wherein the first protrusions abut against the first unit cell, and the second protrusions abut against the second unit cell.

3. The battery assembly according to claim 1, wherein the slit extends in a direction crossing the plurality of cooling passages, and
wherein the straight portion connects one edge and the other edge of the slit.

4. The battery assembly according to claim 1, wherein the spacer further includes a first bar and a second bar at one end and at the other end in a direction perpendicular to the plurality of cooling passages of the corrugated portion, and
wherein the straight portion connects the first bar and the second bar.

5. The battery assembly according to claim 3, wherein the straight portion is located offset from the center in the thickness direction of the spacer to one side or the other in the thickness direction.

6. The battery assembly according to claim 3, wherein the straight portion is located at a midpoint of a dimension of the clearances in the thickness direction of the spacer.

7. The battery assembly according to claim 3, wherein the straight portion has a thickness smaller than a dimension of the clearances in the thickness direction of the spacer.

8. The battery assembly according to claim 3, wherein one end of the straight portion on an upstream side of the plurality of cooling passages is chamfered at a corner portion.

9. The battery assembly according to claim 3, wherein one end of the straight portion on a downstream side of the plurality of cooling passages is chamfered at a corner portion.

10. The battery assembly according to claim 1, wherein the straight portion is made of metal.

11. The battery assembly according to claim 1, wherein the slit extends in a direction crossing the plurality of cooling passages.

12. The battery assembly according to claim 11, wherein a width of the straight portion is less than a width of the slit.

13. The battery assembly according to claim 11, wherein a thickness of the straight portion is less than a thickness of the clearances between the first protrusions and the second unit cell, and less than a thickness of the clearances between the second protrusions and the first unit cell.

14. The battery assembly according to claim 1, wherein the straight portion increases a rigidity of the corrugated portion is in the direction perpendicular to a direction of the plurality of cooling passages.

15. The battery assembly according to claim 1, further comprising:
a stack case comprising a first and second walls, and a bottom plate connecting the first and second walls,
wherein the spacer is formed on the bottom plate and extends between the first and second walls.

16. The battery assembly according to claim 15, wherein the first and second protrusions and the plurality of cooling passages extend in a direction from the first wall of the stack case to the second wall of the stack case.

17. The battery assembly according to claim 15, wherein the first and second walls comprise an inner portion and an outer portion, a space between the inner and outer portions forming an other cooling passage, and
wherein the inner portion of the first wall comprises a first plurality of openings and the inner portion of the second wall comprises a second plurality of openings, the spacer being aligned with an opening of the first plurality of openings and an opening of the second plurality of openings.

18. The battery assembly according to claim 1, wherein the slit of the corrugated portion comprises a plurality of slits, and the straight portion comprises a plurality of straight portions which are formed in the plurality of slits, respectively.

19. A battery assembly comprising:
a first unit cell and a second unit cell arranged adjacent to each other; and a spacer arranged between the first and second unit cells, the spacer comprising:
  a corrugated portion comprising:
    first protrusions protruding from a center in a thickness direction of the spacer toward the first unit cell to form a first plurality of cooling passages between the first protrusions and the second unit cell; and
    second protrusions protruding from the center in the thickness direction toward the second unit cell to form a second plurality of cooling passages between the second protrusions and the first unit cell, the first and second protrusions continuously and repeatedly alternating in a direction perpendicular to the first plurality of cooling passages and the second plurality of cooling passages; and
  a straight portion extending in a direction crossing the first plurality of cooling passages and the second plurality of cooling passages,
wherein the corrugated portion comprises a slit and the straight portion is formed in the slit.

\* \* \* \* \*